Dec. 30, 1952          S. MALKE          2,623,973

PIPE FLASH WELDER

Filed Jan. 18, 1951          7 Sheets-Sheet 1

INVENTOR.
Sven Malke
BY Andrus & Sceales
ATTORNEYS.

Dec. 30, 1952 S. MALKE 2,623,973
PIPE FLASH WELDER
Filed Jan. 18, 1951 7 Sheets-Sheet 4

INVENTOR.
Sven Malke
BY Andrus & Sceales
ATTORNEYS.

INVENTOR.
Sven Malke
BY Andrus & Sceales
ATTORNEYS.

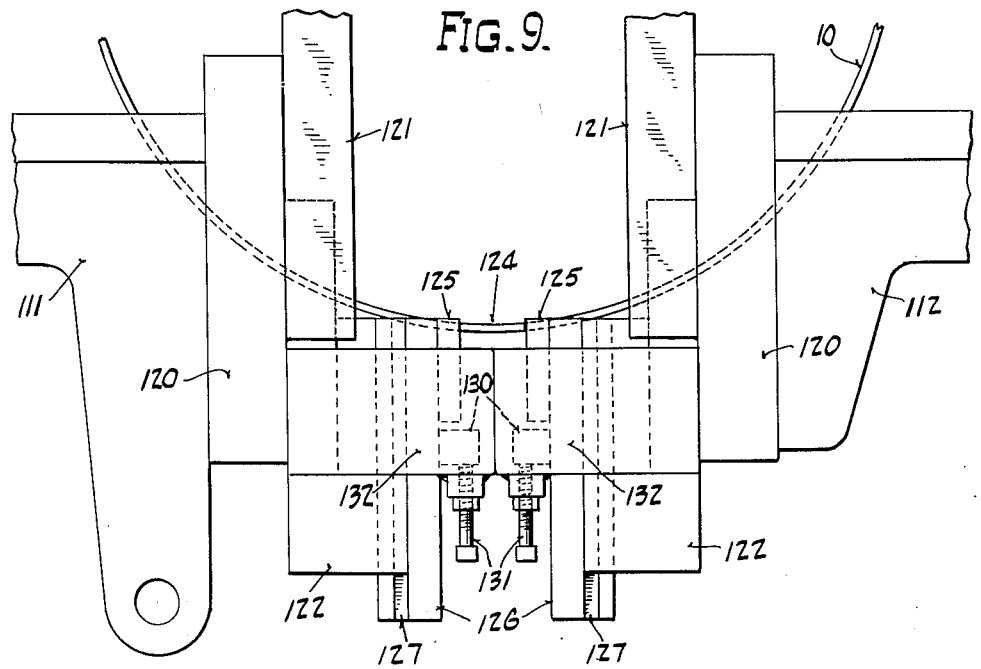
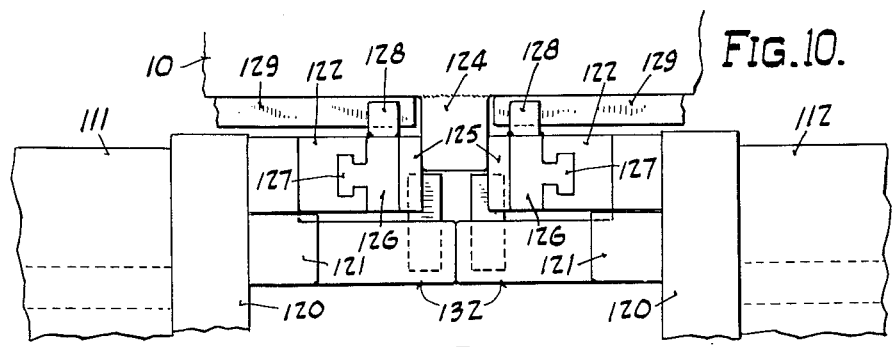
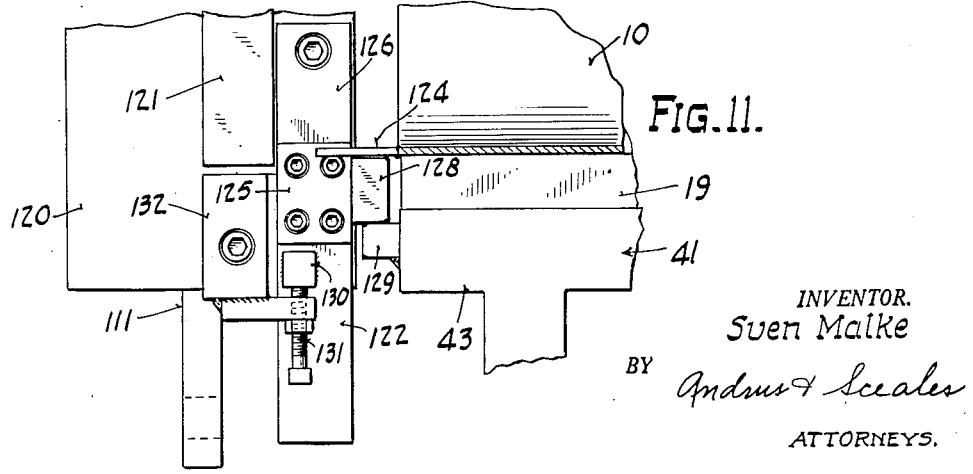

Patented Dec. 30, 1952

2,623,973

UNITED STATES PATENT OFFICE 2,623,973

PIPE FLASH WELDER

Sven Malke, Milwaukee, Wis., assignor to A. O. Smith Corporation, Milwaukee, Wis., a corporation of New York Application January 18, 1951, Serial No. 206,561

21 Claims. (Cl. 219—6)

This invention relates to welding machines, and particularly to a machine for mass producing flash welded pipe of substantial length and diameter.

An object of the invention is to provide a pipe flash welder wherein the clamping of the rocker elements with respect to the blank to be welded is effected without the use of movable frames.

Another object of the invention is to provide a pipe welding apparatus wherein the elements which clamp the back of the blank, opposite the welding gap, are carried by the elements which move the edges of the blank during the flash welding thereof, so that there is no movement in the bearings of the back clamping means during welding and the amount of wear therein is maintained at a minimum.

A further object is to provide a flash welder having means to balance or equalize the clamping motions of opposed back clamping elements.

Another object of the invention is to provide a flash welder transformer carriage which is adjustable for various sizes of pipe and which is designed to eliminate the necessity of having flexible conducting cables between the transformers and the supports therefor.

Another object is to provide means operable to rectify or correctly position the blank in a substantially frictionless manner and to maintain such rectification without undesirable sliding between the rectifying means and positioning lugs at the ends of the blank.

A further object of the invention is to provide automatic means for vibrating the blank to remove foreign matter therefrom and insure proper contact between the welding electrodes and the edge portions to be welded.

Another object is to provide a relatively simple linkage arrangement operable to pivot the opposed edges of the blank about an axis disposed in the bottom of the blank diametrically opposite the welding gap between said edges, whereby slipping movement between the blank and electrodes is prevented and the maintenance of proper clamping pressure assured.

The flash welder is constructed with a plurality of axially spaced rocker members arranged in two corresponding parallel rows, one on each side of the tubular blank to be welded. The rockers are provided on their inner edges with upper die and electrode members shaped to engage the opposed longitudinal edge portions of the blank, and each rocker row is supported on an eccentric shaft journaled in the axially spaced frame plates between which the various pairs of opposed rockers are nested. The back of the blank is clamped in position by independently movable lower die members and actuating cylinders therefor, both the dies and cylinders being carried by the respective rockers so that there is no relative movement between the dies and rockers when the eccentric shafts are turned to simultaneously pivot the rockers and upper die members for variation of the distance between the edges of the blank during the flash welding thereof. Means are provided to rectify the pipe blank prior to welding, to clean the edge portions of the blank and insure proper electrode contact therewith, and to insure that the clamping movements of opposed lower clamping dies will be balanced.

Other objects and advantages of the invention will be set forth more fully in the following description of an embodiment of the invention illustrated in the accompanying drawings, wherein:

Fig. 9 is a detail end view of the rectifying jaw mechanisms;

Fig. 10 is a top plan view of the showing of Fig. 9;

Fig. 11 is a vertical central section of the showing of Fig. 9; and

Fig. 12 is a partial section taken along line 12—12 of Fig. 2.

Figure 1:
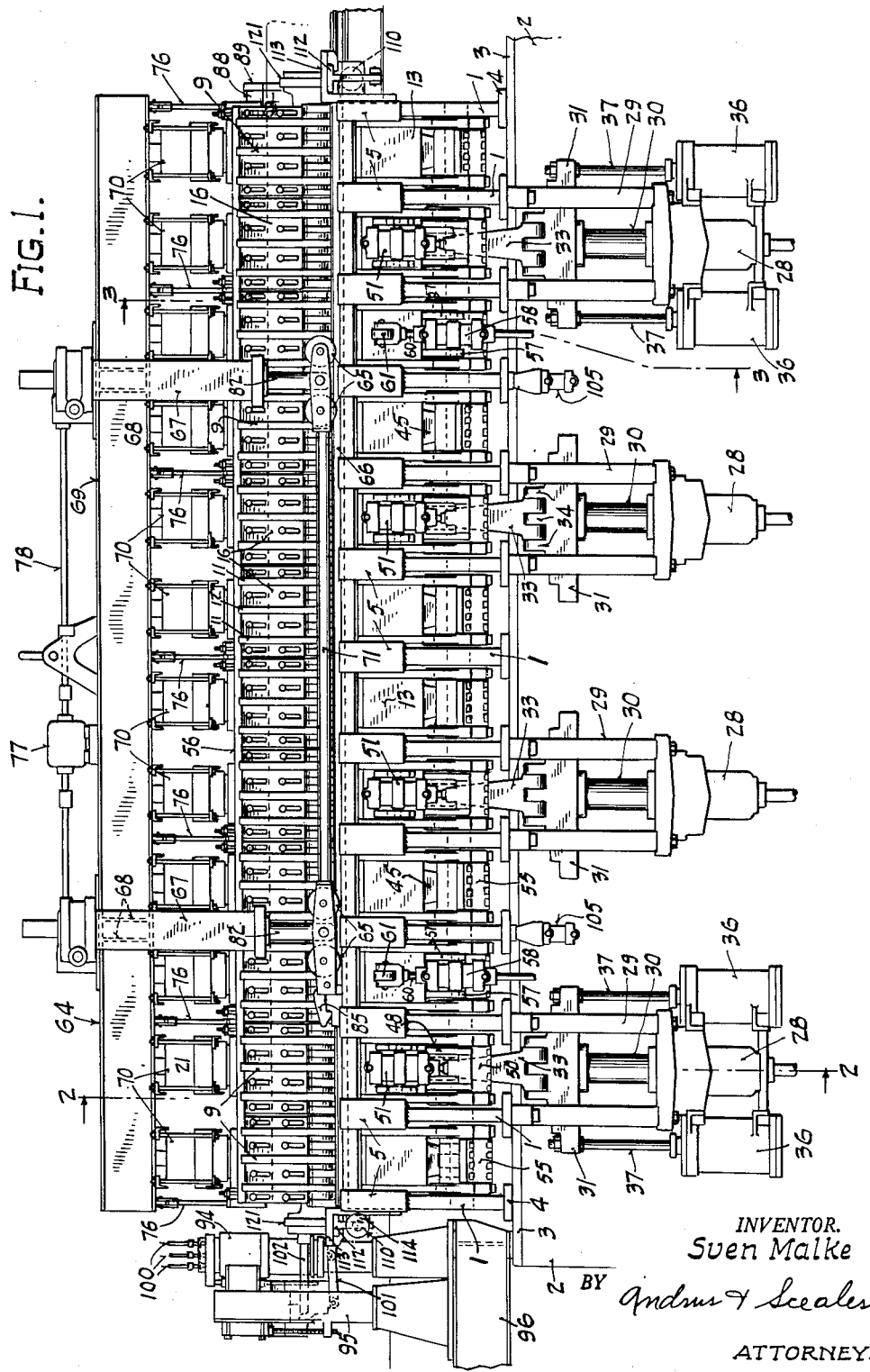
Figure 1 is a side elevation of the flash welding machine in its closed position.
Figure 2:
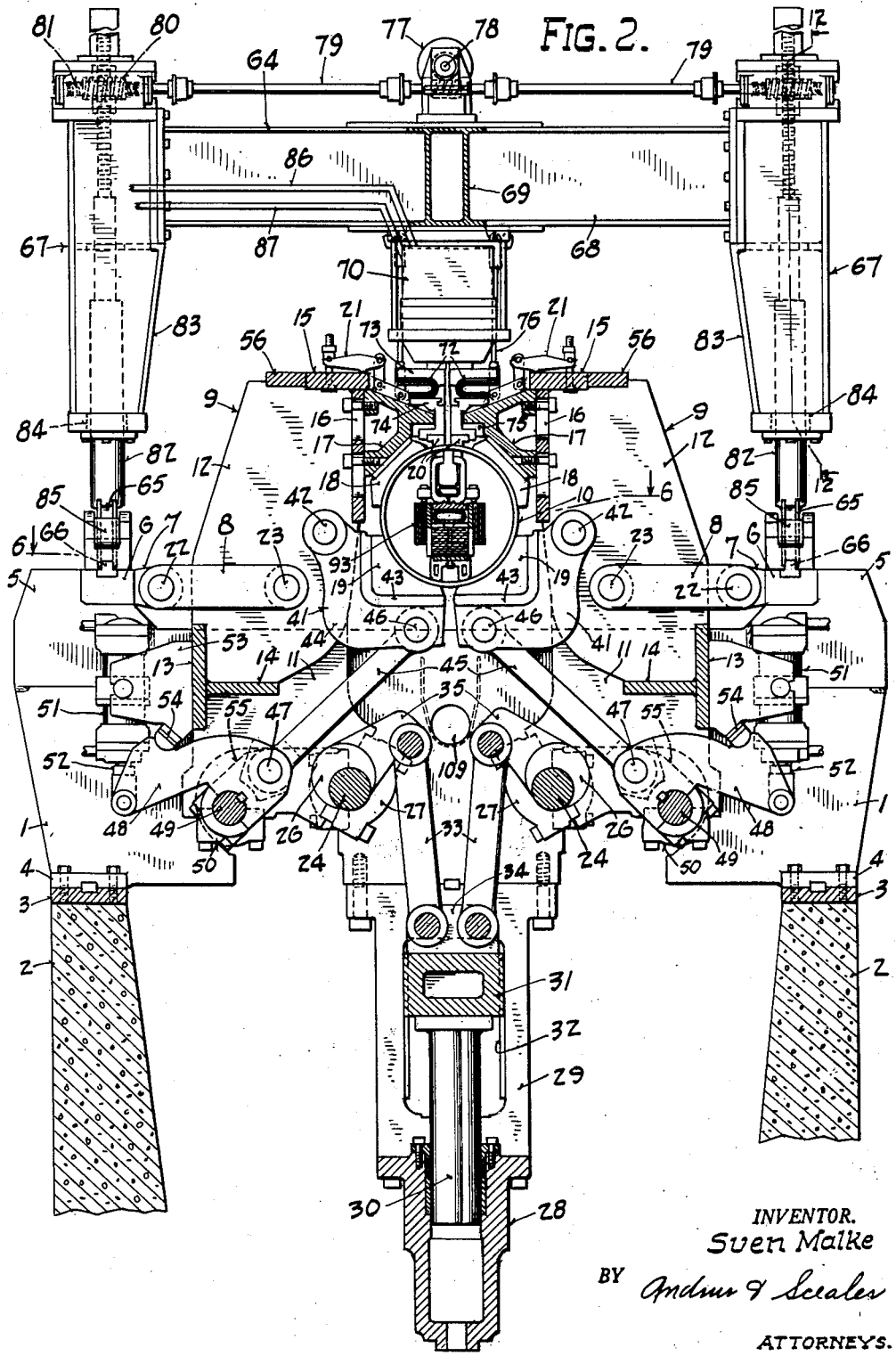
Fig. 2 is a cross sectional view taken along line 2—2 of Fig. 1 and showing the clamping dies as closed on the pipe blank.
Figure 3:
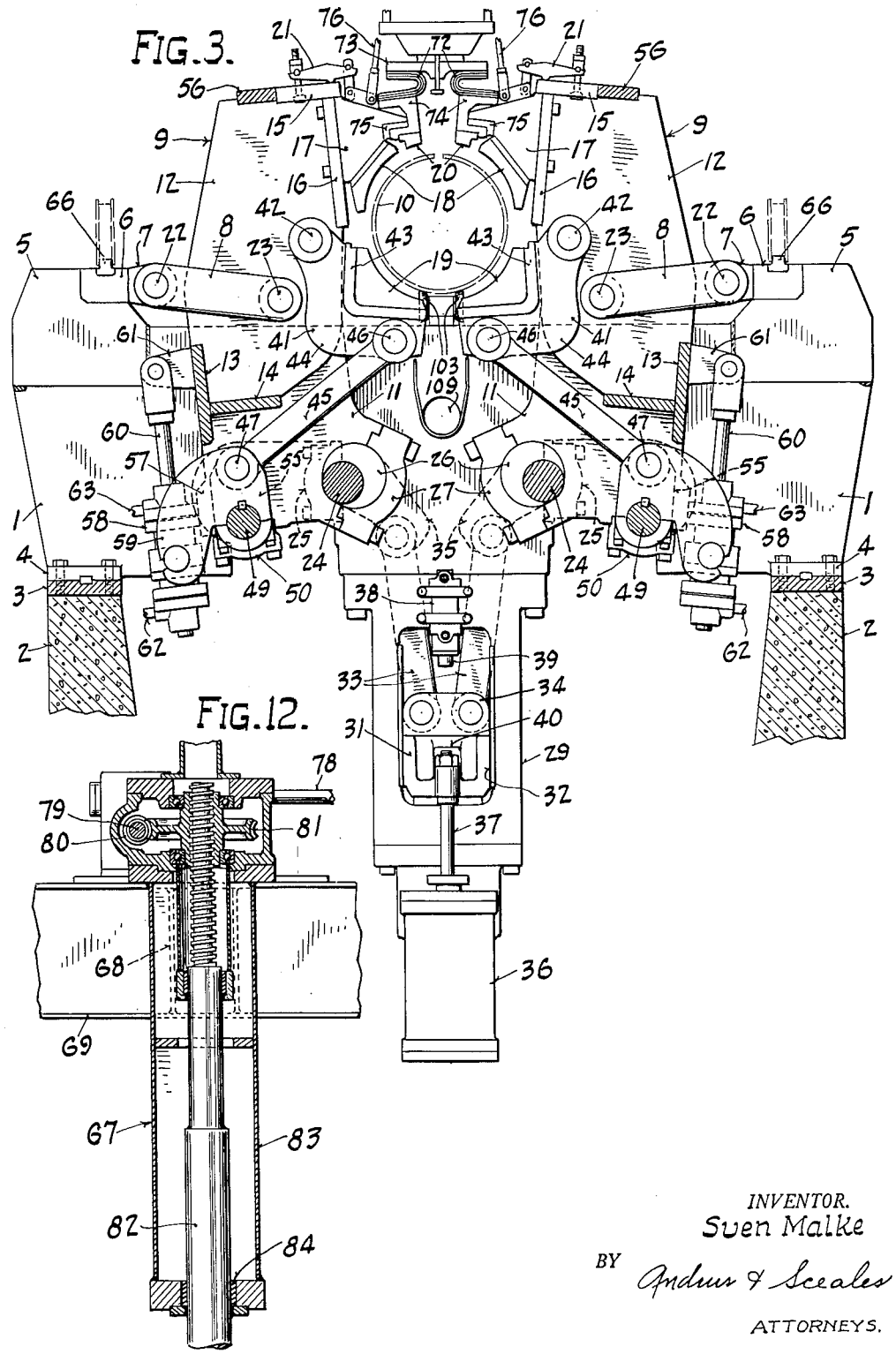
Fig. 3 is a section taken at line 3—3 of Fig. 1, illustrating the positions of the various links with the clamping dies in open position.

Referring to the drawings and especially to Figs. 1–3 thereof, the basic structure for the flash welding apparatus comprises a plurality of axially spaced steel frame plates 1 bridged between a pair of concrete supporting piers 2 which are of sufficient strength to support the entire weight of the apparatus under working conditions. In order to insure stable engagement between the frames 1 and piers 2, a steel cap plate 3 is provided along the upper surface of each pier and is rigidly secured to corresponding foot plates 4 welded to the under edges of the respective frames.

The upper and outer edges of the various frames 1 are raised and thickened by means of insert portions 5 which are welded in corresponding indentions in the relatively thin main bodies of the frames. Similarly, the upper and inner edges of the inserts 5 are indented to receive suitable journal brackets 6 bolted thereto.

Figure 6:
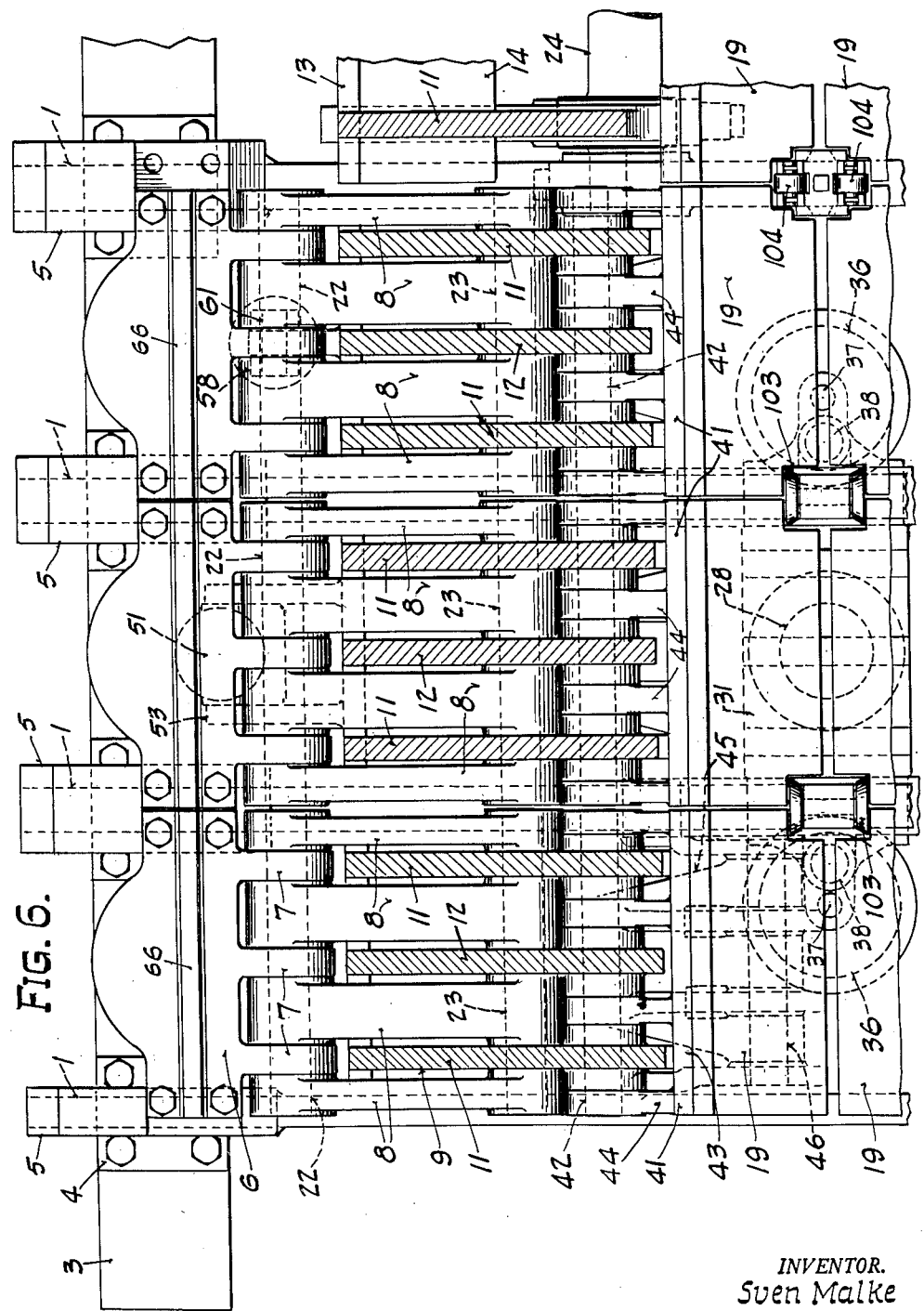
Fig. 6 is a partial horizontal section taken along line 6—6 of Fig. 2.

As best shown in Fig. 6, each journal bracket is bolted in bridged relation between two adjacent frame portions 5 and consequently aids in preventing the frames from tilting. The inner surface of each bracket 6 is provided with three spaced ears 7 for pivotal connection with a plurality of links 8 leading to the rocker members 9 next to be described.

The rockers 9, which constitute the primary moving parts of the welding machine, are arranged in axially spaced pairs for co-operative action upon a tubular pipe blank 10 disposed therebetween. Referring to Figs. 1 and 6, each pair of opposed rockers 9 is nested between two adjacent frame plates 1, so that where thirteen frames are employed for the particular length of pipe to be welded there will be twelve pairs of rockers as illustrated in Fig. 1.

Each of the rockers 9 is constructed with two vertically arranged parallel outer plates 11 and with a smaller center plate 12 which corresponds with the upper portions of the outer plates. The lower portions of the three rocker plates are rigidly connected by a vertical plate 13 welded to the outer edges thereof and by a plate 14 normal to plate 13 and welded to the inner surfaces of outer plates 11 and to the under edge of center plate 12.

In order to brace the upper portions of the plates 11 and 12 of each rocker 9, a horizontal connecting bar 15 is welded along the upper edges thereof. In addition, a vertical plate 16 is welded to the inner rocker plate edges for service both as a brace and as a mounting means for a die support 17.

During operation of the flash welding apparatus, the blank 10 to be welded is disposed horizontally and with the gap between the longitudinal edges thereof in its uppermost position. The width of this gap is governed by the distance between a number of pairs of upper dies 18 which engage the edge portions of the blank and are removably secured, respectively, to the opposed die supports 17. The back of the pipe blank, that is to say the lower portion thereof generally opposite the edge portions, is clamped in position by pairs of lower dies 19. The actuating means for the lower dies, as well as the structure of the electrodes 20 which supply welding current to the longitudinal edges of the blank, will be described subsequently.

It is important, for flexibility of manufacturing operations, that the apparatus be adapted for the welding of pipes having a variety of diameters. Accordingly, the plate 16 is provided with vertical slots (Figs. 1 and 2) for upward and downward adjustment of the bolts which secure the die supports 17 in position. Fine adjustment of the positions of the die supports 17, and thus of the upper dies 18, may be accomplished by means of shims used in conjunction with suitable lever clamps 21 mounted along the bars 15.

In adjusting the machine for different diameters of pipe, it is necessary to change the dies 18 and 19 correspondingly since the curvature of the die faces is made to conform to the curvature of the outer surface of the blank to be welded. The use of conforming dies, plus a construction whereby the various upper and lower dies 18 and 19 engage substantially the entire circumference of the pipe blank for the full length thereof, prevents the blank from bulging when the rockers are pivoted to bump the heated edges together under final welding pressure.

Returning to the structure of the rocker members 9 and the means for supporting and pivoting the same, the links 8 for each rocker (Figs. 2, 3 and 6) are journaled on a short shaft 22 mounted in the ears 7 and extend inwardly therefrom between the various rocker plates 11 and 12 for pivotal connection with a corresponding shaft 23 mounted perpendicularly of the rocker plates. Referring to Fig. 6, four links 8 are shown for each rocker 9 and journal bracket 6, with the links for laterally adjacent rockers being parallel to each other and co-operating to form a continuous connection between the rockers and the stationary frame portions of the apparatus.

Besides the links 8, the only other mounting means interconnecting the rockers and the frame portions of the welder comprise a pair of shafts 24 extending longitudinally of the pipe blank 10 for the entire length thereof. The shafts 24, one for each row of rockers 9, are rotatably supported by means of bearing caps 25 (Figs. 3 and 5) which are bolted, respectively, to bearing portions of vertical inner edges of the frame plates 1 formed by cutting out parts of the frames beneath the respective links 8.

Transverse clamping movement of the rockers upon turning of the shafts 24 is effected by a plurality of eccentric discs 26 formed integral with the respective shafts and disposed therealong for engagement with suitable bearing surfaces at the lower inner corners of the outer rocker plates 11. The eccentrics 26 are held against these bearing surfaces by bearing caps 27 which are secured to the rocker plates 11.

Referring to Figs. 2 and 3, the radial alignment of the eccentric discs 26 is such that rotation of the two eccentric shafts 24 in opposite directions will cause a generally pivotal movement of the rockers 9 to either open or close the upper clamping dies 18 relatively to the edges of the pipe blank. For example, to clamp the dies 18 from the position shown in Fig. 3 to the position of Fig. 2, the left shaft 24 is turned in a counterclockwise direction and the right shaft in a clockwise direction. The described arrangement, wherein the various rockers are nested between frame plates and supported by eccentric shafts mounted in the frame plates, permits such clamping to be effected without the use of movable frames or other cumbersome structure.

As best shown in Figs. 1-4, the mechanism for turning the eccentric shafts 24 to open and close the upper dies 18 comprises a plurality of hydraulic cylinders 28 which are suspended from the frames 1 by means of transverse guide brackets 29, the supporting piers 2 being made sufficiently high to provide adequate clearance for the brackets. Each of the cylinders 28, four of which are illustrated in Fig. 1 as spaced along the length of the welding machine, may be bolted to the under edges of two of the guide brackets 29 which in turn are bolted to the under edges of two adjacent frame plates 1.

Each cylinder 28 has mounted therein a piston 30 which extends upwardly for connection with a coresponding cross head 31 arranged longitudinally of the machine. Referring to Fig. 2, the ends of each cross head 31 project through vertical slots 32 in their associated guide brackets 29, so that the vertical edges of the cross heads slide along the corresponding edges of the slots 32 to maintain the cross heads in precise longitudinal alignment.

Figure 4:
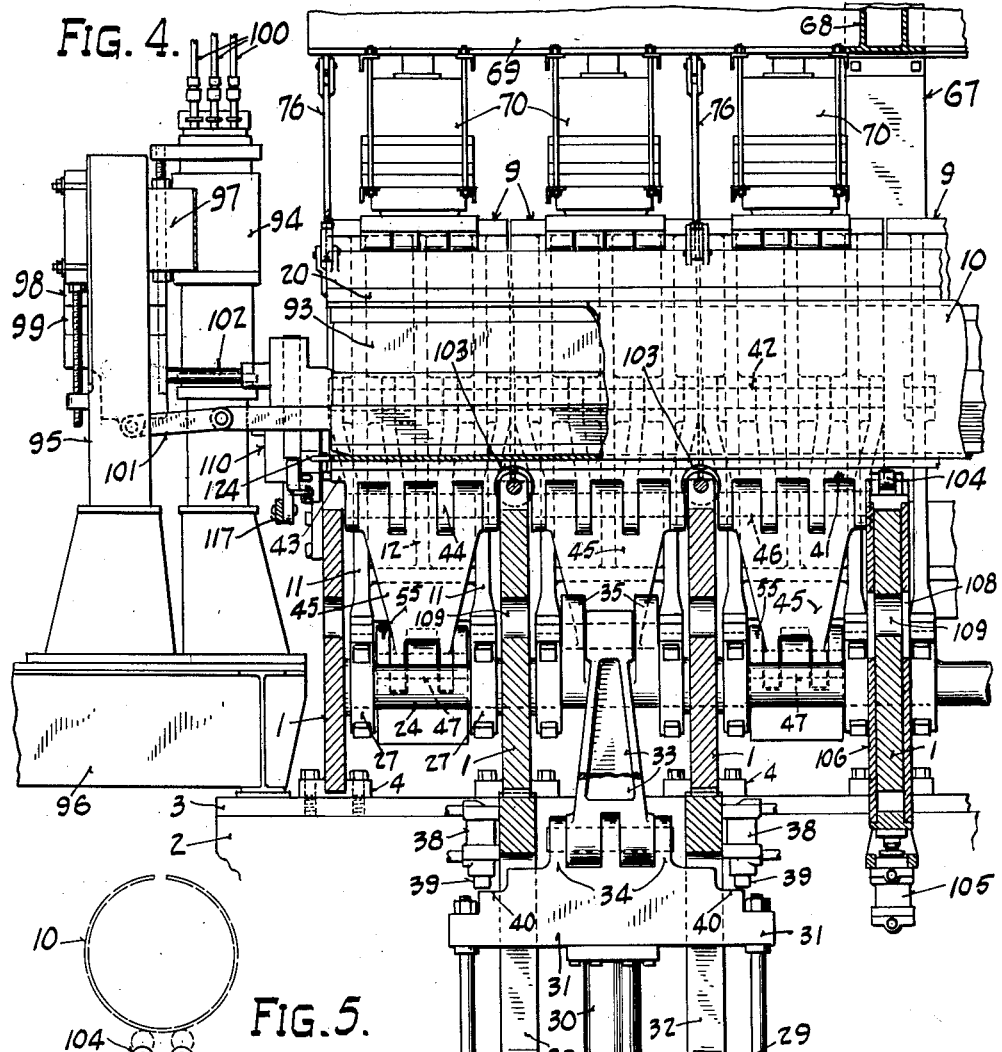
Fig. 4 is a longitudinal vertical central section of the feed end of the apparatus.

The eccentric shafts 24 are turned upon upward movement of the cross heads 30 by means of corresponding pairs of links 33 pivotally connected between suitable ears 34 on cross heads 31 and crank arms 35 on the shafts 24. The crank arms 35, two of which are shown in Fig. 4 for each link 33, extend inwardly from shafts 24. Accordingly, when the cross heads 31 are moved upwardly the left shaft 24 in Fig. 3 will be moved in a counterclockwise direction by the left links 33 and the right shaft in a clockwise direction by the right links, causing the rockers 9 to assume the closed position illustrated in Fig. 2.

The hydraulic cylinders 28 and pistons 30 are of the single action variety adapted to exert a very large upward force to close the dies 18 on the pipe blank 10 and bump the edges thereof together, after the flashing operation, with a large predetermined pressure. In comparison with the force required for the bump, the force necessary to lower the cross heads 31 and open the upper dies 18 is relatively small.

To provide this die opening force, a pair of air cylinders 36 is mounted on each of the two hydraulic cylinders 28 depending from opposite ends of the machine. The respective pistons for the air cylinders 36 are connected through rods 37 to the ends of the corresponding cross heads 31 and operate to pull the cross heads downwardly and effect opening of the rockers and dies after the fluid pressure in the cylinders 28 has been released.

Where the welder is employed in the manufacture of large pipe, for example forty inches in diameter, it is possible that the rockers will stick and will not open under the downward force exerted by the air cylinders 36. It may therefore be desirable to mount a small hydraulic cylinder 38 and piston 39 above each air cylinder 36 on the upper lateral surfaces of guide brackets 29. The pistons 39 are disposed, as shown in Figs. 3 and 4, to press downwardly upon horizontal shoulder portions 40 provided adjacent the upper ends of rods 37 on the various cross heads 31.

As the cross heads 31 are moved upwardly and downwardly by the hydraulic and air cylinders previously described, the resulting rotation of the eccentric shafts 24 not only operates to open and close the rockers 9 and upper dies 18 but to raise and lower the same a slight distance. It is therefore necessary to raise and lower the lower dies 19, and thus the pipe blank 10, a corresponding distance in order to maintain the blank in clamped position against the upper dies.

This vertical movement of the lower dies has previously been accomplished by cumbersome actuating means moving relatively to the upper dies during substantially the entire welding operation, causing a large amount of wear to the bearings of the lower dies actuating means and necessitating relatively frequent overhaul and replacement. To eliminate this and other difficulties, the lower dies and die actuating means of the present invention are carried by the rockers 9 which also carry the upper dies 18. Vertical movement of the lower dies 19 is accordingly accomplished with no motion in the bearings for the lower die actuating means during flashing and the amount of bearing wear is substantially reduced.

Referring now to Figs. 1–4 and 6 for the structure of the actuating means for the lower dies 19, a plurality of pairs of generally V-shaped lower die holders 41 are pivotally connected at their upper and outer corners to corresponding short shafts 42 which are suitably mounted above shafts 23 perpendicularly of the rocker plates 11 and 12. The various die holders 41, one for each of the rockers 9, are illustrated as formed with V portions 43 facing the pipe blank 10 and connected by bolts, not shown, to the lower dies 19 nested therein. The V portions 43 are each integral with four corresponding ribs 44 which are pivoted on shaft 42 and converge downwardly and inwardly (Fig. 4) between the rocker plates 11 and 12 in order to clear the frame plates 1 between which the rockers are carried.

In order to pivot each die holder 41 about its shaft 42, so that the dies 19 engage or disengage the pipe blank 10, a connecting link 45 is pivotally connected to a shoft shaft 46 mounted in the lower inner ends of the ribs 44 for each die. The links 45 each extend downwardly and outwardly beneath the related rocker plate 12 for pivotal connection with a shaft 47 mounted in one of three different types of levers or connecting cranks which will next be described.

Referring to Figs. 1 and 2, the first type of member to which certain of the links 45 are pivotally connected are the actuating levers 48 shown in Fig. 1 as located correspondingly to the hydraulic cylinders 28, that is to say at the second, fifth, eighth and eleventh rockers 9 counting from the left or feed end of the machine. The respective pairs of actuating levers are rigidly connected by keys and bearing caps to drive shafts 49 which extend for the entire length of the welder parallel to and outwardly of the eccentric shafts 24. Contrary to the case of the eccentric shafts 24, which are journaled in the stationary frames 1 of the machine, the shafts 49 are journaled by means of bearing caps 50 in the lower edges of the outer rocker plates 11 and accordingly move with the rockers.

The levers 48 are actuated to rotate shafts 49 and open the lower dies 19 by corresponding double acting hydraulic cylinders 51 having downwardly extending pistons 52 pivotally connected to the outer ends of the levers, opposite the ends thereof in which shafts 47 and 49 are located. Each cylinder 51 is pivotally mounted in a bracket 53 welded to one of the plates 13 which connect the rocker plates 11 and 12.

With the described arrangement, operation of the cylinders 51 to move their pistons 52 downwardly rotates the left drive shaft 49 in a counterclockwise direction and the right shaft clockwise, and in addition moves the associated links 45 to pivot their lower die holders 41 outwardly and disengage the dies 19 from the pipe blank. When the pistons are actuated in an upward direction, the shafts 49 are rotated and the lower dies 19 closed to predetermined positions, there being stop members 54 provided between the levers 48 and brackets 53 for this purpose.

The second type of member to which certain of the links 45 are pivotally connected for actuation of the lower die holders 41 are the simple crank arms 55 shown in Figs. 2 and 4. The arms 55, which are keyed to the respective drive shafts 49 at the first, fourth, sixth, seventh, ninth, and twelfth rockers from the left in Fig. 1, merely serve to move their associated links 45 upon turning of the shafts 49 to open or close the corresponding die holders 41 and dies 19.

Because of the mounting of the rockers 9 on the eccentric shafts 24 which extend for the full length of the machine and are turned by a single set of hydraulic cylinders 28, it is assured that all of the rockers 9 and thus upper dies 18 will move simultaneously. Such simultaneous movement is further assured by a pair of key plates 56 mounted along the full length of the machine on the upper edges of the respective rows of rockers 9 to lock the rockers together.

Although the lower dies 19 are operated, similarly to the operation of rockers 9, by the turning of shafts 49 which extend longitudinally for the entire length of the welder, it is possible that friction or other factors may cause the lower dies on one side of the machine to close before the dies on the other side thereof. This undesirable unbalanced action is possible because the drive shafts 49 and thus the rows of lower dies 19 on opposite sides of the machine are operated by separate sets of cylinders 51 as distinguished from the single set of cylinders 28 employed to move the eccentric shafts 24 and rockers 9.

Accordingly, the third type of member to which certain of the links 45 are pivotally connected are the equalizing levers 57 shown in Fig. 3 and at the third and tenth rockers from the left in Fig. 1. The levers 57 are keyed to the respective drive shafts 49 in the same manner as the actuating levers 48 (Fig. 2) and have corresponding double acting cylinders 58 pivotally mounted in their downwardly curving outer ends 59. The cylinders 58 float on upwardly extending piston rods 60 which are pivoted to suitable brackets 61 on the brace plates 13 for the related rockers 9.

In order to co-ordinate the turning of the two drive shafts 49 which operate the lower dies 19, the bottom hose connections 62 for opposed equalizing cylinders 58 are mutually connected through hoses, not shown, to the top hose connections 63 for the opposite cylinders. Turning of the equalizing levers 57 in opposite directions, through actuation of the drive shafts 49 by the actuating cylinders 51, will therefore cause not only the opening or closing of the corresponding dies 19 but the mutual filling of the upper or lower chambers of the cylinders 58 by liquid from the opposite chambers of the cylinders on the opposite sides of the welder.

For example, when the left shaft 49 in Fig. 3 is turned counterclockwise and the right shaft 49 is turned clockwise at the same angular velocity, the lower dies 19 will open and liquid from the upper chambers of opposed equalizing cylinders 58 will be forced into the lower chambers of the cylinders opposite thereto. The liquid exchange will be accomplished with no retarding force on either drive shaft 49 since the capacity of the lower or receiving cylinder chambers is always equal to the volume of liquid being forced out of the upper or discharging chambers.

Where, on the other hand, the left shaft 49 tends to turn counterclockwise faster than the right shaft turns clockwise, the capacity of the lower chamber of each cylinder 58 at the right side of the welder will be insufficient to hold the fluid forced from the upper chamber of each cylinder at the left side thereof, creating a back pressure against the upper end of each left cylinder which retards the left equalizing levers 57 and the corresponding shaft 49 until both drive shafts are moving at the same speed in balance with each other.

The supporting and adjusting structure for the electrodes 20 and related apparatus will next be described. As shown in Fig. 1, this structure comprises a transformer carriage 64 straddling the welder and having wheels 65 mounted for movement along a pair of tracks 66. The tracks 66 are preferably anchored along the upper surfaces of the journal brackets 6 (Fig. 2), so that the size of the carriage is much smaller than in structures wherein the tracks are located on concrete piers, etc. separate from the machine.

The carriage is formed with two pairs of uprights 67 connected at their upper ends by a generally horizontal frame having two transverse beams 68 and a centrally located located longitudinal beam 69 supported thereby. The beam 69 extends for the full length of the machine to carry a plurality of depending transformers 70, one for each pair of rockers 9. As illustrated in Fig. 1, the rigidity of the carriage may be increased by means of a pair of braces 71 disposed adjacent the respective tracks 66 and connected between the mountings for the wheels 65 at the lower ends of the uprights.

The transformers 70 serve to supply alternating current of opposite polarity to the two electrodes 20 which extend along the full length of the pipe blank 10 in engagement with the respective edge portions thereof. To conduct current from the transformers to the electrodes, flexible leads 72 are connected between contact blocks 73, leading to the respective transformer terminals, and lead blocks 74 to which the electrodes 20 are bolted. The lead blocks 74 may be rigidly supported by suitable back-up plates 75 mounted on the die supports 17, with both the lead blocks and dies 18 being electrically insulated from the die supports to prevent undesirable conduction of current thereto.

Referring to Figs. 1 and 3, the die supports 17 are pivotally connected by pairs of tie rods 76 to the center beam 69 of the transformer carriage. Although the pairs of rods 76 are shown as located above alternate frame plates 1 only, they present adequate support for the die supports 17 and associated structure, when the die supports are disconnected from the slotted plate 16, since each die support and upper die extends for two rocker sections instead of one. Due to the vertical movement of the die supports 17 during welding, the tie rods 76 are only connected thereto when it is desired to adjust the welder.

In order to permit adjustment of the welder for different diameters of pipe, as previously described, and also to facilitate complete removal of the electrodes, upper dies and die supports for purposes of repair and replacement, means are provided to move the frame of the transformer carriage 64 in either an upward or downward direction.

These means comprise an electric motor 77 mounted on the center beam 69 to drive longitudinal shafts 78 and thus, through suitable gearing, transverse shafts 79 journaled above the respective beams 68. As shown in Figs. 2 and 12, the ends of the transverse shafts 79 are provided with worms 80 for engagement with corresponding worm gears 81 journaled in gear housings at the upper ends of the uprights 67.

The hub of each worm gear 81 is bored out and threaded to receive the upper threaded end of a post portion 82 of the corresponding upright 67. The post extends downwardly through a shell portion 83 of the upright and is connected to the mounting for the associated wheels 65, there being two wheels for each upright. To maintain the post portion 82 of each upright in correct alignment with the bearings for the corresponding worm gear 81, a bearing 84 is provided at the lower end of the shell 83 for sliding engagement with the outer surface of the post.

With the described arrangement, operation of the motor 77 to rotate the internally threaded worm gears 81 moves the entire frame of the transformer carriage, including the center beam 69 and transformer 70, upwardly or downwardly along the upper threaded ends of the posts 82 with which the worm gears are associated. It is accordingly possible to adjust the welder for different diameters of pipe by performing the following steps:

The rockers 9 are first opened and the tie rods 76 are attached to the die supports 17, after which the supports 17 are unbolted from the slotted plates 16. The die supports 17, upper dies 18 and electrodes 20 are thus supported solely by the rods 76. The transformer carriage is then rolled along the tracks 66 and extensions thereof until the lower and upper dies, etc., are accessible for replacement by dies having curvatures conforming the diameter of the pipe which it is desired to weld. After the dies have been replaced and other necessary repairs made, the carriage 64 is rolled back into place and held in its correct location by a latch 85. Finally, the motor 77 is operated to vertically move the upper dies and electrodes to the desired position, and the die supports 17 are bolted to plates 16 to prepare the machine for welding.

Because of the use of a transformer carriage wherein the entire upper portion is vertically movable, the welder may be adjusted for different pipe diameters with a minimum of gears and drives and without the necessity of having flexible current conducting cables between the various transformers 70 and the source of alternating current. In place of such flexible cables, which are subject to wear and have relatively high loss characteristics, the present invention embodies bus bars 86 and 87, Fig. 2, leading from the respective transformers 70 to a suitable contact post, not shown. The contact post is preferably of the tongue and resilient groove variety, with the grooved member sliding up or down relative to the tongue as the carriage is operated to adjust the welder.

During the flash welding operation the transformers 70 deliver very heavy currents to the electrodes 20 and thence to the edges of the pipe blank 10, making it necessary to provide the best possible contact between the electrodes and the edge portions in order to prevent flashing therebetween. Such contact is partially achieved through the use of air streams blasted along the edge portions to effect a cleaning action as the blank is inserted into the welder.

Figure 8:
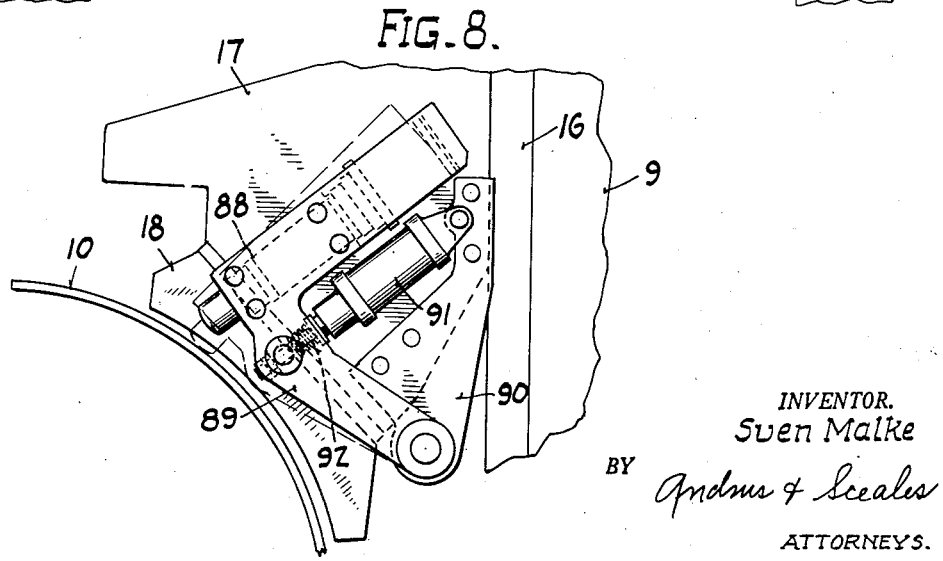
Fig. 8 is a detail view of the air hammer device employed in cleaning the edge portions for welding.

The air blast, however, is insufficient to remove the large particles of flash and other foreign matter which frequently drop on the edges during the insertion of the blank, so that additional cleaning means must be provided. Referring to Fig. 8, these means comprise a suitable automatic air hammer 88 arranged at the discharge end of the machine (to the right in Fig. 1) to vibrate the edges of the blank.

The hammer 88 is mounted on a V bracket 89 which is pivotally connected to the lower end of a bracket 90 on one of the die supports 17. To move the head of the air hammer against one of the longitudinal edge portions of the blank 10, a double acting air cylinder 91 is pivoted to the upper end of the bracket 90 and connected through a spring 92 to a lug on the V bracket 89 adjacent the head of the air hammer.

In operation, air is admitted to the cylinder 91 through suitable hoses, not shown, to resiliently urge the head of the air hammer 88 against one of the longitudinal edge portions of the blank 10. The hammer 88 is then operated, by the admission of air through other hoses, not shown, to vibrate the edge and cause large particles of flash and dirt to drop therefrom. It has been found that it is only necessary to engage the hammer with one edge portion of the blank since vibration of one edge is sufficient to vibrate the entire blank and shake flash from the opposite edge.

As the rockers 9 are operated during the flash welding operation to move the edges of the blank 10 toward and away from each other, the edge portions are held tightly against the electrodes 20 by an expansible arbor 93, Figs. 2 and 4. The arbor 93 is the same, except for slight modifications, as the one illustrated in United States Patent 1,872,793 for a Flash Welding Machine, issued August 23, 1932, and invented by Eric Nilson et al.

As described in the patent referred to, the arbor is held in position by a pair of columns 94 and 95 (Figs. 4 and 7) resting on a foundation beam 96 and connected at their upper ends by a cross beam 97. A holding bracket 98 having a thin web portion 99 is secured to the underside of the cross beam 97, with the web portion being adapted to pass between the longitudinal edges of the blank 10 when the latter is inserted into the machine. Pressure and cooling fluids are fed into the arbor 93 through hoses 100 and also through passages, not shown, in the bracket 98 and web portion 99.

Due to the upward and downward movement of the blank 10 and arbor 93 during welding, the referred to patent illustrates means for moving the holding bracket 98 correspondingly, there being rigid connections illustrated between the bracket and arbor to hold the arbor in place and to feed the various fluids thereto. In the present construction, however, the holding bracket 98 is maintained stationary and the movement of the arbor compensated for by the use of the pivoted link 101 and flexible hose connections 102 shown in Fig. 4.

Referring to Figs. 3 and 6, as the pipe blank 10 is fed into the machine it telescopes over the arbor 93 and is supported on suitable feed rollers 103 mounted on the majority of frame plates 1. Clearance for the feed rollers 103, as well as for rectifying rollers 104 next to be described, is provided by forming recesses in the inner corners of the various lower dies 19 and die holder portions 43.

Contrary to the case of the feed rollers 103 which revolve on transverse axes for frictionless feeding of the pipe blank 10, the rectifying rollers 104 are revolvable about longitudinal axes to facilitate rotation or rectification of the blank. Such rectification is performed prior to welding in order to correctly align the arbor 93 and the edges of the blank with respect to the electrodes 20.

Figure 5:
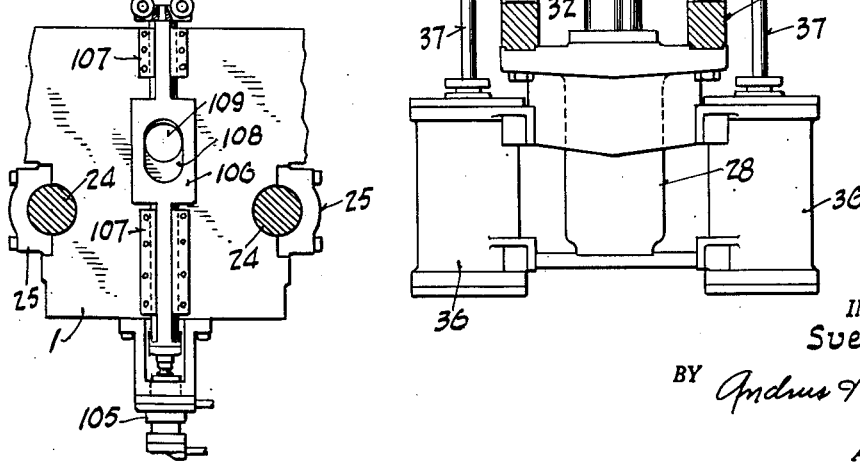
Fig. 5 is a detail view of certain of the rectifier rollers and the actuating cylinders therefor.

The rectifying rollers 104, which are shown in Figs. 1 and 4 as mounted at the fourth and tenth frame plates 1 from the end of the welder, are vertically movable by corresponding hydraulic cylinders 105 depending from suitable brackets at the lower edges of said frame plates. Referring to Fig. 5, the operative connection between each cylinder 105 and its associated rollers 104 may take the form of a pair of slide bars 106 secured to the piston of the cylinder 105 and to the mounting for the rollers. The bars 106 are shown as dovetailed into corresponding guide gibs 107 and are provided at their centers with relatively wide apertured portions 108 to prevent interference with cleaning holes 109 in the various frame plates 1.

During feeding of a blank 10 into the welder the feed rollers 103 prevent friction contact between the blank and either the lower dies 19 or the rectifying rollers 104, the latter being disposed at a lower level than the rollers 103 while the blank is fed. Fluid is then admitted into the hydraulic cylinders 105 to cause lifting of the blank off the feed rollers 103 and permit substantially frictionless rotation of the blank about its longitudinal axis.

Figure 7:
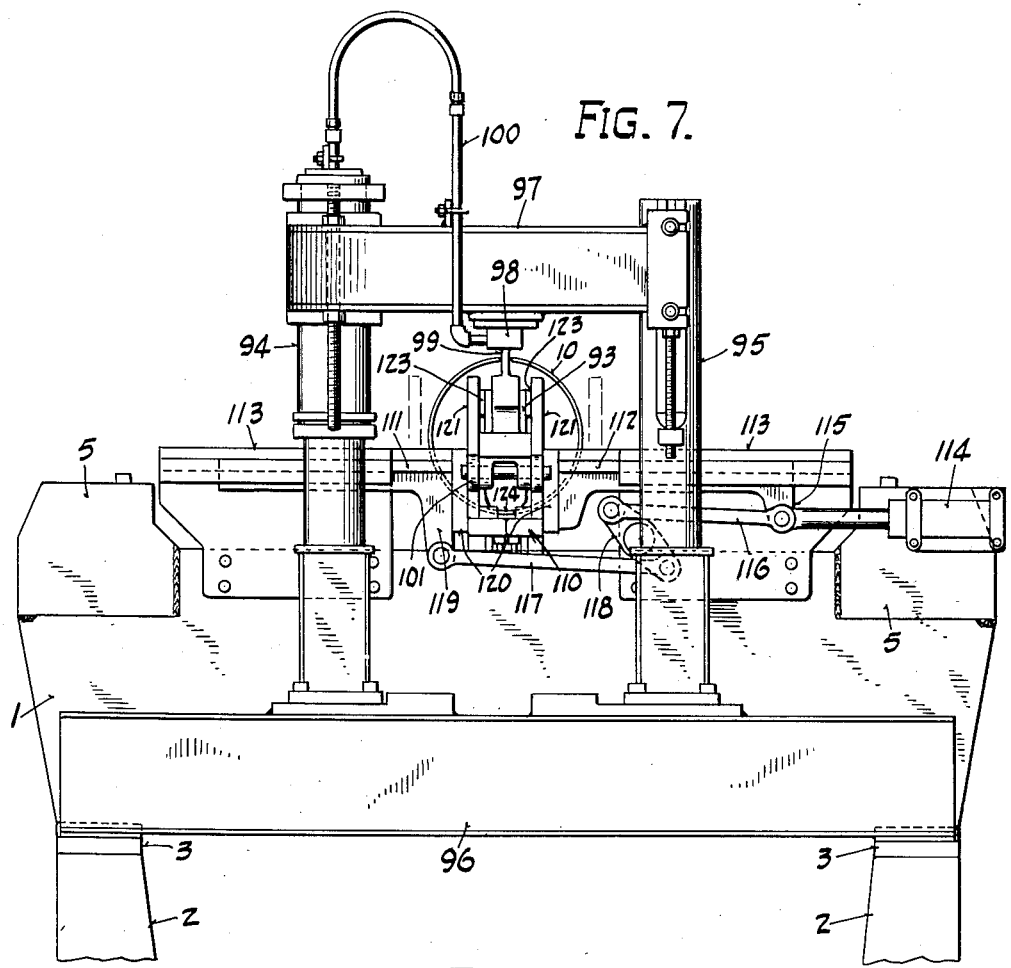
Fig. 7 is an end view of the feed end of the welder, with the background structure being eliminated for greater clarity.

This rotation or rectification of the blank 10 and arbor 93, in order to correctly position the same with respect to the electrodes 20, is accomplished by means of jaw mechanisms 110 located one at each end of the machine. As shown in Figs. 1 and 7, each mechanism 110 comprises left and right sliding jaw members 111 and 112 having T-shaped cross sections for slidable mounting in correspondingly slotted guide brackets 113 which are bolted to an end frame plate 1 on opposite sides of the pipe blank.

To slide the members 111 and 112 towards and away from each other, a hydraulic cylinder 114 is mounted on one of the frame plate inserts 5 at the right side of the welder, looking from the feed end thereof as in Fig. 7. The piston of the cylinder 114 is directly connected to an arm 115 on the right jaw 112 and indirectly connected, by means of links 116 and 117 and a lever 118 pivoted at its center on the right guide bracket 113, to an arm 119 on the left jaw member 111.

The inner edges of the members 111 and 112 have back-up bars 120 secured thereto to provide proper mounting surfaces for a pair of opposed upwardly extending posts 121 as well as for guide castings 122 bolted inwardly thereof. The posts 121 are disposed to engage bearing plates 123 on the arbor 93, thereby correctly positioning the arbor, when the jaws 111 and 112 are actuated toward each other through operation of the cylinder 114 and lever 118.

Prior to the introduction of the pipe blank 10 into the welder, a positioning lug 124 is welded to each end thereof diametrically opposite the gap between the edges to be welded. The lugs are adapted to be engaged, as shown in Figs. 9 and 10, by wear plates 125 operated by the jaw members 111 and 112 to rectify the pipe blank 10 similarly to the rectification of the arbor 93.

As previously described, the pipe blank 10 and arbor 93 move vertically during welding as an incident of the operation of the eccentric shafts 24 to clamp the associated rockers 9 and upper dies 18. In addition, the arbor and blank are lifted off the rectifying rollers 104 by the upward pivoting of the lower dies 19 to clamp the blank.

Although the resulting sliding action between the arbor bearing plates 123 and the posts 121 is permissible, it is highly undesirable to permit relative sliding between the rough temporary lugs 124 and the plates 125 in engagement therewith.

To prevent such relative sliding, with consequent possibility of misalignment of the blank and sticking or breakage of the lugs 124, the wear plates 125 are bolted to vertically slidable bars 126 having T portions 127 fitted into T slots in the guide castings 122. The slide bars 126 have lugs 128 welded to their inner edges for engagement with horizontal bars 129 welded to the outer edges of the adjacent lower die holders 41.

When the lower dies 19 are pivoted or clamped upwardly, after the jaw mechanisms 110 have been closed, the bars 129 engage lugs 128 and lift the slide bars 126 and thus plates 125 in accordance with the vertical movement of the dies. Upon downward pivot of the lower dies, other lugs 130 on the slide bars 126 engage stationary stop bolts 131 to arrest the slide bar movement. The bolts 131 are adjusted so that the slide bar motion is started simultaneously with the lifting engagement of the pipe blank 10 by the lower dies 19 and is stopped as the blank is released by the dies, thereby preventing the referred to undesirable sliding motion between the pipe lugs 124 and plates 125.

The bolts 131 are preferably mounted at the under surfaces of inwardly extending arm portions 132 of the guide castings 122. To aid in the accurate centering of the pipe lugs 124, the ends of the arms 132 are illustrated in the drawings as being in abutment when the rectifying jaw mechanisms 110 are closed.

The following is a description of a preferred manner of operating the flash welder.

Before the blank 10 is inserted into the machine the rockers 9 and upper and lower dies 18 and 19 are brought to the open position illustrated in Fig. 3. In addition, the arbor 93 is collapsed and the rectifying rollers 104 are moved to their lower position.

The pipe blank 10 is then moved into the feed end of the welder (left side of Fig. 1) by suitable conveyor means, not shown. As the blank is inserted the underside thereof rests on the feed rollers 103 and the edges to be welded pass on opposite sides of the thin web portion 99 of the holding bracket 98 for the arbor 93.

During the insertion, air is blown along the longitudinal edge portions to partially clean the same and to clear the machine of smoke from the previous welding operation. Such smoke removal is necessary to permit inspection of the edges in order to insure that the various mechanisms are functioning properly.

After the blank 10 has come to rest in the welder, fluid is admitted into the cylinders 105 (Fig. 5) to raise the rectifying rollers 104 and lift the blank off the feed rollers 103. The rectifying cylinders 114 of the jaw mechanisms 110 (Fig. 7) are then operated to close the opposed jaw members 111 and 112. In closing, the posts 121 mounted on the jaw members engage the bearing plates 123 to align the arbor 93, and the pipe blank is similarly aligned by contact of the wear plates 125 with the pipe lugs 124 as shown in Figs. 9-11. The jaw mechanisms 110 are preferably maintained in their closed position throughout the entire welding operation to aid in the maintenance of correct edge alignment beneath the electrodes 20.

As the next step, fluid is introduced into the main hydraulic cylinders 28, thereby actuating the cross heads 31, connecting links 33 and crank arms 35 to rotate the eccentric shafts 24. The resulting lifting and pivoting movement of the rockers 9 is continued until the upper dies 18 are approximately half closed, at which time the fluid supply to cylinders 28 is cut off. In this partially closed position the upper dies 18 are only a slight distance from the pipe blank.

The cylinder 91 is then utilized to move the head of the air hammer 88 (Fig. 8) into engagement with one of the edge portions. Thereafter, the hammer is actuated to vibrate the edge portions and cause the particles of flash, which may have dropped thereon during the preceding steps, to fall therefrom and render the edge portions completely clean for good electrical contact with the electrodes 20. After this cleaning step the hammer is retracted, by reverse operation of the cylinder 91, to prevent interference with subsequent movements of the blank.

The hydraulic cylinders 51, Fig. 2, are next operated to turn the drive shafts 49, thereby causing the connecting links 45 to pivot the lower dies 19 upwardly against the blank. As previously described, simultaneous clamping action of all the lower dies 19 is insured by the functioning of the equalizing cylinders 58 shown in Fig. 3.

The upright pivot of the lower dies 19 lifts the blank 10 off the rectifying rollers 104 and engages the upper portion thereof with the upper dies 18 and electrodes 20, so that substantially the full circumference of the blank is engaged by the upper and lower die surfaces to prevent the blank from bulging during welding. As described in connection with Figs. 9–11, while the blank is thus moved vertically the plates 125 of the jaw mechanisms 110 move with the positioning lugs 124 and prevent undesirable sliding therebetween.

In order to insure correct edge alignment, the main cylinders 28 are again operated to complete the closing of the rockers 9 and upper dies 18 and force the edges into the pressure contact illustrated in Fig. 2.

The arbor 93 is then expanded, as described in the patent referred to, to force the edge portions into firm contact with the electrodes 20 and minimize contact resistance therebetween.

After the edges to be welded have thus been brought into abutting alignment, the rockers 9 are operated in a reverse direction to separate the edges. This reverse movement is accomplished by the air cylinders 36 which pull the cross heads 31 downwardly, after the fluid pressure in the cylinders 28 has been released, and thus effect reverse turning of the eccentric shafts 24.

Thereafter, the rockers 9 and thus upper dies 18 are slowly closed, by operation of the main hydraulic cylinders 28 as before described, and welding current is applied to the edges through the medium of the transformers 70 and electrodes 20.

When certain limited regions of the opposite edges contact each other, the metal of the edges in contact is immediately fused and flashed off and an arc is established in such regions. Movement of the edges toward each other is continued until successive regions along the same have been flashed off and a uniform arc is established for the full length of the edges, after which the arc is maintained by feeding the edges together at a carefully controlled speed until the metal at the edges has been brought to a plastic welding condition.

The rockers 9 are then operated to rapidly force the edges together to weld, extrude, and upset the same. This latter step, known as the bump, is performed under extremely high pressure. The welding current may be interrupted either before, during, or after the bumping operation.

The arbor 93 is then collapsed and the rockers 9 and upper and lower dies 18 and 19 are opened to the positions shown in Fig. 3. The rectifying jaw mechanisms 110 are also opened and the rollers 104 are lowered, so that the welded pipe rests on the feed rollers 103 and may be discharged from the machine by the insertion of the next succeeding blank.

As the edges of the blank 10 are moved towards each other during the described flashing operation, the pressure exerted by the arbor 93 is sufficient to lock the edge portions against the electrodes 20 and the upper dies 18 and positively prevent slipping therebetween. The length of arc and rate of edge feeding can accordingly be regulated with great precision to provide uniformity in the production of large quantities of welded pipe.

During the final upsetting or bumping operation, however, the pressures created are so large that the arbor 93 is ineffectual to prevent slipping. Since slipping at this time between the blank 10 and the dies 18 would result in nonuniform bumping pressures fatal to the mass production of high quality welded pipe, the movement of the rockers 9 must of itself be such that the edge portions of the blank move with the dies and electrodes and do not slip relative thereto.

In the present invention such slipping is prevented by lifting the rockers 9 as they are pivoted, through the operation of the eccentric shafts 24, and by mounting the links 8 so that they point toward the lowermost portion of the blank wall, diametrically opposite the edges, when the rockers are closed as shown in Fig. 2. A clam shell-like pivotal action of the walls of the blank about a phantom axis located in said lowermost portion is thereby achieved, which action results in a positive grip between the blank and dies and prevents the slipping which would occur if the phantom axis were located any substantial distance from said portion.

The described flash welder embodies extremely simple and effective means of producing the desired movements in the edges of the blank to be welded. The absence of movable frames, as well as a construction wherein bearing motion is maintained at a minimum, make possible the mass production of large diameter pipe with substantially lessened mechanical power input and with relatively few stoppages for overhaul and replacement of parts.

Various embodiments of the invention may be employed within the scope of the following claims:

I claim:

1. In a machine for flash welding the opposed longitudinal edges of a tubular blank, a frame, a pair of rockers carried by said frame and arranged opposite each other for inward operation upon said blank, a first pair of dies secured to said rockers and shaped to engage the blank adjacent said longitudinal edges, a second pair of dies movably mounted on said rockers for engagement with the back of said blank, means carried by said rockers to move said second pair of dies to clamp the blank against said first pair of dies, means to supply welding current to the full length of said edges, and means to actuate said rockers and thus said dies to move said edges together and apart and effect flash welding thereof.

2. In a machine for flash welding the opposed longitudinal edges of a tubular blank, a frame, cooperating rockers mounted on said frame and arranged opposite each other for inward operation upon said blank, electrodes carried by said rockers and shaped to engage substantially the full length of said blank immediately adjacent said longitudinal edges, upper dies carried by said rockers and fixed adjacent said electrodes to engage said blank outwardly thereof, lower dies pivotally mounted on said rockers for engagement with the back of said blank, fluid operated means carried by said rockers to pivot said lower dies and thus clamp the blank against said upper dies, and fluid operated means to actuate said rockers to determine the width of the gap between said longitudinal edges.

3. In a machine for flash welding the opposed longitudinal edges of a tubular blank, a stationary frame, a pair of generally vertical rockers arranged opposite each other adjacent said frame, a corresponding pair of generally horizontal links pivoted between said frame and the mid portions of said rockers, means to move said rockers vertically and to effect an inward clamping motion of the upper ends thereof, clamping dies carried by the upper ends of said rockers to bring said edges together as said upper ends are clamped inwardly, and means to hold said blank against said dies, said dies being disposed to cause the portion of the wall of said blank diametrically opposite said longitudinal edges to be in approximate alignment with the pivot points of said links when said rockers are in clamped position.

4. In a machine for flash welding the opposed longitudinal edges of a tubular blank, a stationary frame, a pair of generally vertical rockers arranged opposite each other adjacent said frame, a corresponding pair of generally horizontal links pivotally connected to said frame and to the mid portions of said rockers, fluid operated means to move the lower ends of said rockers upwardly and outwardly to effect an inward clamping motion of the upper ends thereof, electrodes mounted at the upper ends of said rockers to engage said blank adjacent said longitudinal edges, upper clamping dies secured to the upper ends of said rockers for engagement with said blank outwardly of said electrodes, lower clamping dies movably mounted on said rockers beneath said upper dies, and fluid operated means carried by said rockers to move said lower dies against said blank and urge the same against said electrodes and said upper dies, said upper dies being disposed to cause the portion of said blank diametrically opposite said longitudinal edges to be in approximate alignment with the pivot points of said links when the rockers are in clamped relation.

5. In a machine for flash welding the opposed longitudinal edges of a tubular blank, a stationary frame, a plurality of rocker members arranged in parallel rows on opposite sides of said blank and having die portions shaped to engage said blank adjacent said edges, link means interconnecting said rocker members and said frame, a pair of shafts journalled in said frame and extending longitudinally of the respective rows of rocker members, said shafts having eccentric portions operatively associated with said rocker members to effect inward clamping of said die portions upon turning of said shafts, and fluid operated means to turn said shafts and effect said clamping movement, said arrangement operating to insure simultaneous clamping of the rocker members in each of said parallel rows.

6. A flash welding machine for tubular blanks, comprising a plurality of axially spaced frame sections, rocker members mounted in nested relation between said frame sections and arranged in two parallel rows for inward operation upon the tubular blank disposed therebetween, a pair of shafts journalled in said frame sections and extending perpendicularly thereof one for each of said rows of rocker members, means mounted on said shafts and operatively associated with said rocker members to effect a clamping movement thereof upon turning of said shafts, and a plurality of cylinders spaced along said shafts and operatively connected thereto to turn the same and effect said clamping movement for variation of the distance between the longitudinal edges of said tubular blank being operated upon.

7. A machine for welding the longitudinal edges of tubular blanks, comprising a plurality of axially spaced frame plates, rockers disposed in nested relation between said frame plates and arranged in two parallel rows for inward operation upon the tubular blank to be welded, link means pivotally connected to said frame plates and to the rockers associated therewith, a pair of eccentric shafts journalled in said frame plates and extending one through each of said rows of rockers, and a row of fluid operated cylinders and pistons arranged longitudinally of said rows of rockers and connected to both of said shafts to turn the same and effect a simultaneous clamping movement of said rockers to vary the distance between the longitudinal edges of the tubular blank being welded.

8. A machine for flash welding a relatively large tubular blank, comprising a stationary frame, a plurality of rocker members mounted on said frame and arranged in parallel rows on opposite sides of said blank for inward operation thereon, first die means secured to the inner portions of said rocker members and disposed to engage said blank adjacent the longitudinal edges thereof, second die means movably mounted on said rocker members and disposed to engage the back of said blank generally opposite said edges, a pair of shafts journalled in said rocker members and extending one through each row thereof, means operatively connecting said shafts with said second die means, a plurality of fluid operated cylinders and pistons mounted on said rocker members and connected to said shafts to turn the same and thus operate said second die means to clamp the blank against said first die means, means to supply welding current to the full length of said longitudinal edges, and means to open and close said rocker members for variation of the distance between said edges, said arrangement operating to prevent motion in the bearings of said shafts due to movement of said rocker members during welding.

9. A machine for flash welding a relatively large tubular blank, comprising a stationary frame, a plurality of rocker members mounted on said frame and arranged in parallel rows on opposite sides of said blank for inward operation thereon, first die means secured to the inner portions of said rocker members and disposed to engage said blank adjacent the longitudinal edges thereof, second die means movable mounted on said rocker members and disposed to engage the back of said blank generally opposite said edges, a pair of shafts journalled in said rocker members and extending one through each row thereof, means operatively connecting said shafts with said second die means, a plurality of actuating cylinders and pistons mounted on said rocker members and connected to said shafts to turn the same, equalizing means interconnecting said shafts and assuring simultaneous turning thereof at the same angular velocity to cause a balanced motion of said second die means in clamping the blank against said first die means, means to supply welding current to the full length of said longitudinal edges, and means to open and close said rocker members for variation of the distance between said edges, said arrangement operating to insure simultaneous motion in the bearings of both shafts prior and subsequent to flashing and to render unnecessary motion in the bearing of either shaft during the flashing operation.

10. In a flash welding machine, supporting means, separate clamping means movably mounted on said supporting means for engagement with a tubular blank, a pair of shafts journalled in said supporting means, separate means operatively connecting each of said shafts with the clamping means corresponding thereto, separate means to turn the respective shafts and thus effect movement of said clamping means against said blank, a pair of corresponding double acting equalizing cylinders and pistons mounted on said supporting means and operatively connected one to each of said shafts, a first fluid line interconnecting the chamber on one side of the piston for one of said cylinders to the chamber on the opposite side of the piston for the other of said cylinders, and a second fluid line interconnecting the remaining two chambers of said cylinders, the exchange of liquid between said pairs of interconnected chambers operating when said shafts are turned to equalize the angular velocities and locations of said shafts and effect a balanced movement of said clamping means against said blank.

11. A machine for flash welding the longitudinal edges of a tubular blank, comprising a stationary frame, a pair of generally vertical rockers arranged opposite each other adjacent said frame, a corresponding pair of generally horizontal links pivotally connected to said frame and to the mid portions of said rockers, a pair of eccentric shafts journalled in said frame and extending respectively through said rockers beneath said links, a pair of upper clamping dies secured to the inner portions of said rockers above said links and shaped to conform to the curvature of said tubular blank adjacent the longitudinal edges thereof, a pair of lower clamping dies pivotally mounted on the respective rockers and disposed to engage the back of said blank generally opposite said longitudinal edges, a pair of shafts journalled in the respective rockers and operatively connected to the corresponding lower clamping dies mounted thereon, separate fluid operated means mounted on said rockers and connected, respectively, to said last named shafts to actuate said lower dies and thus urge the blank against said upper dies, and fluid operated means to turn said eccentric shafts to effect an outward and upward motion of the lower ends of said rockers and thus an inward clamping motion of said upper dies against said longitudinal edges, said upper dies being arranged to cause the pivot points of said links to be in approximate alignment with the portion of the wall of said blank diametrically opposite said longitudinal edges when said upper dies are in clamped relation.

12. A machine for flash welding the longitudinal edges of a tubular blank, comprising a plurality of axially spaced frame plates, a plurality of generally vertical rockers nested between said frame plates and arranged in two parallel rows for inward operation upon said tubular blank, a plurality of generally horizontal links pivotally connected to the outer portions of said frame plates and to the mid portions of the rockers associated therewith, a pair of eccentric shafts journalled in said frame plates and extending one through each of said rows of rockers beneath said links, upper clamping dies secured to the inner portions of the respective rockers above said links and shaped to conform to the curvature of said tubular blank adjacent said longitudinal edges, lower clamping dies pivotally mounted on the respective rockers beneath said upper dies for engagement with the back of said blank, a pair of shafts journalled in said rockers and extending one through each row thereof for operative connection with the lower clamping dies corresponding thereto, fluid operated cylinders and pistons mounted on said rockers and connected, respectively, to said last named shafts to actuate said lower dies and thus urge the blank against said upper dies, and a row of fluid operated cylinders and pistons depending from said frame plates and connected to both of said eccentric shafts to turn the same and effect an outward and upward motion of the lower ends of said rockers and thus an inward clamping motion of said upper dies against said blank adjacent said edges, said upper dies being arranged to cause the pivot points of said links to be in approximate alignment with the portion of the wall of said blank diametrically opposite said longitudinal edges when said upper dies are in clamped position.

13. An adjustable flash welding machine, comprising a frame, a plurality of rocker members mounted on said frame and arranged in parallel rows on opposite sides of the tubular blank to be welded, electrodes removably secured at the upper portions of said rockers and disposed to engage substantially the full length of said blank immediately adjacent the longitudinal edges thereof, clamping die means removably secured to said rockers adjacent said electrodes to engage said blank outwardly thereof, means to open and close said rockers to clamp and unclamp said die means and said electrodes with respect to said blank, a unitary frame mounted above said rows of rockers and having a plurality of transformers supported thereon, bus bars mounted on said frame and connected between said transformers and a source of alternating current, flexible leads electrically connecting said transformers to said electrodes to supply welding current thereto, mechanical means to connect said frame with said die means and said electrodes to support the same after the disconnection thereof from said rockers, and means operable when said rockers are in an open position to vertically move said unitary frame and thus the die means and electrodes depending therefrom to thereby adjust the machine for welding blanks having a variety of diameters.

14. The combination with a flash welder clamping apparatus having rocker means movably mounted on opposite sides of the tubular blank to be welded, said rocker means having die and electrode means removably secured thereto for inward operation upon said blank as said rocker means are opened and closed, of a transformer carriage comprising a unitary frame arranged above said rocker means, a plurality of posts disposed on opposite sides of said rocker means to support said frame, a plurality of transformers mounted on said frame and connected in circuit with said electrode means and with a source of alternating current, means to connect said frame with said die and electrode means to support the die and electrode means after the disconnection thereof from said rocker means, and motor operated means mounted on said frame and operatively associated with said posts to vertically move said frame therealong, said arrangement being operable when said rocker means are in open position to adjust said clamping apparatus for welding blanks having a variety of diameters.

15. In a machine for flash welding the longitudinal edges of a tubular blank, a plurality of lower clamping dies movably mounted for upward clamping against the back of said blank, rectifying rollers mounted adjacent said lower dies and having axes extending longitudinally of said blank, fluid operated means to move said rollers upwardly against the back of said blank and maintain the same out of engagement with said lower dies, means to rotate said blank about the longitudinal axis thereof until said edges are in a predetermined welding alignment, and means to clamp said lower dies against the back of said blank and lift said edges into welding position, said rotation of the blank being accomplished in a substantially frictionless manner due to the action of said rectifying rollers.

16. In a machine for flash welding the longitudinal edges of a long tubular blank, a plurality of lower clamping dies movably mounted in aligned relation for upward clamping against the back of said blank, a set of feed rollers mounted between certain of said lower dies and having axes extending transversely to said blank, said feed rollers projecting above said lower dies during feeding of said blank into and out of the machine to support said blank and prevent engagement thereof with said dies, a set of rectifying rollers mounted between other of said lower dies and having axes extending longitudinally of said blank, said rectifying rollers being disposed out of engagement with the blank during said feeding operations, means to vertically move said rectifying rollers relatively to said feeding rollers until said blank is resting solely on said rectifying rollers, means operable while the blank is resting solely on said rectifying rollers to rotate the blank about the longitudinal axis thereof and bring said edges into alignment beneath a pair of electrodes and upper clamping dies, and means to clamp said lower dies against the back of said blank to lift said edges into welding position against said electrodes and upper dies, whereby rectification of said blank is accomplished without friction contact between said blank and said feeding rollers and lower dies.

17. In a machine for flash welding the longitudinal edges of a long tubular blank having positioning lugs projecting outwardly from the ends thereof, die means conforming to the outer circumference of said blank, means to clamp said die means against the blank and to move said die means and blank in a direction transverse to said blank, jaw means to engage said positioning lugs to thereby rotate the blank about the longitudinal axis thereof until said edges are in a predetermined welding alignment, and means projecting from said die means and adapted to engage said jaw means to cause the same to move with said die means and blank in said transverse direction and thus prevent relative motion between said positioning lugs and the jaw means in engagement therewith.

18. In a machine for flash welding the longitudinal edge portions of a tubular blank having a temporary positioning lug welded to an end thereof opposite said edge portions, upper die and electrode means disposed above said edge portions and shaped to engage substantially the full length thereof, lower die means movably mounted beneath said blank, means to lift said lower die means against the back of said blank to thereby urge said edge portions against said upper die and electrode means, means to lift both said lower die means and said upper die and electrode means during the flash welding of said edge portions, a pair of jaw members mounted on opposite sides of said positioning lug, a pair of wear members slidably mounted, respectively, in said jaw members for vertical movement relative thereto, fluid operated means to move said jaw members inwardly and engage said wear members with said positioning lug to thereby rotate said blank about the longitudinal axis thereof until said edge portions are in a predetermined position beneath said upper die and electrode means, and stop means arranged on said wear members and disposed to be engaged by a portion of said lower die means simultaneously with the engagement of said lower die means with the back of said blank, said arrangement operating to cause said wear members to move vertically with said positioning lug and prevent sliding motion therebetween.

19. In a machine for flash welding the longitudinal edges of a tubular blank having a positioning lug projecting outwardly from an end thereof, a plurality of lower dies mounted for upward clamping against the back of said blank, rectifying rollers mounted adjacent said lower dies and having axes extending longitudinally of said blank, means to move said rollers upwardly against the back of said blank to lift the blank and maintain the same out of engagement with said lower dies, jaw means to engage said positioning lug and thereby rotate the blank about the longitudinal axis thereof until said edges are in a predetermined welding alignment, said rotation being performed in a substantially frictionless manner due to the action of said rectifying rollers, means to clamp said lower clamping dies upwardly against the back of said blank to lift said blank off said rectifying rollers and into welding position, and stop means operatively connecting said lower dies with said jaw means to cause said jaw means to move vertically therewith, said stop means being adjusted so that the upward movement of said jaw means commences simultaneously with the lifting of said blank off said rectifying rollers to thereby prevent relative sliding between said jaw means and said positioning lug.

20. In a machine for flash welding the longitudinal edge portions of a large diameter tubular pipe blank, die supporting means, a plurality of clamping dies mounted on said die supporting means for engagement with the outer circumference of said blank, a plurality of electrodes disposed to engage said edge portions along substantially the full length thereof, means to clamp said dies against said blank to thereby urge said edge portions into contact with said electrodes, and automatic means to vibrate said edge portions after the insertion of said blank into the machine but prior to the clamping of said edge portions against said electrodes, said vibrating means operating to clean the edge portions of foreign matter falling thereon during the insertion of said blank and thus minimize contact resistance between said portions and said electrodes.

21. The combination with a machine for flash welding the longitudinal edge portions of a long tubular blank, said machine having electrodes and clamping means to engage said edge portions therewith, of a cleaning mechanism comprising an air hammer movably mounted on said clamping means, and fluid operated means to engage the head of said air hammer with one of said edge portions after the insertion of said blank into the machine, whereby said edge portions may be vibrated to clean the same and minimize contact resistance between said portions and said electrodes after the engagement thereof by said clamping means.

SVEN MALKE.

REFERENCES CITED

The following references are of record in the file of this patent:

UNITED STATES PATENTS

| Number | Name | Date |
| --- | --- | --- |
| 1,522,195 | Lemp | Jan. 6, 1925 |
| 1,653,565 | Heineman | Dec. 20, 1927 |
| 1,872,793 | Nilson et al. | Aug. 23, 1932 |
| 2,413,663 | Tiedemann | Dec. 31, 1946 |